United States Patent
Wang

(10) Patent No.: US 7,325,038 B1
(45) Date of Patent: Jan. 29, 2008

(54) MECHANISM FOR TRANSFERRING DATA BETWEEN APPLICATIONS RUNNING ON MULTIPLE NETWORKED COMPUTERS

(75) Inventor: James Y. Wang, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 787 days.

(21) Appl. No.: 10/256,592

(22) Filed: Sep. 27, 2002

(51) Int. Cl.
*G06F 15/167* (2006.01)
*G06F 15/173* (2006.01)
*G06F 17/30* (2006.01)

(52) U.S. Cl. .................. 709/216; 709/225; 709/226; 707/10; 707/205

(58) Field of Classification Search ............... 709/216, 709/225, 226, 227, 228, 229; 707/10, 205
See application file for complete search history.

(56) References Cited

U.S. PATENT DOCUMENTS

| | | | | |
|---|---|---|---|---|
| 5,752,254 A * | 5/1998 | Sakairi | ............... | 715/530 |
| 5,781,192 A * | 7/1998 | Kodimer | ............... | 715/770 |
| 5,964,834 A * | 10/1999 | Crutcher | ............... | 709/213 |
| 6,463,478 B1 * | 10/2002 | Lau et al. | ............... | 709/236 |
| 6,470,389 B1 * | 10/2002 | Chung et al. | ............... | 709/227 |
| 6,487,199 B1 * | 11/2002 | Erimli | ............... | 370/360 |
| 6,493,743 B2 * | 12/2002 | Suzuki | ............... | 709/203 |
| 6,546,488 B2 * | 4/2003 | Dillon et al. | ............... | 713/181 |
| 6,684,372 B2 * | 1/2004 | Tom et al. | ............... | 716/3 |
| 6,691,125 B1 * | 2/2004 | Engle et al. | ............... | 707/102 |
| 6,704,770 B1 * | 3/2004 | Ramakesavan | ............... | 709/205 |
| 6,792,544 B2 * | 9/2004 | Hashem et al. | ............... | 726/30 |
| 6,842,433 B2 * | 1/2005 | West et al. | ............... | 370/312 |
| 6,909,702 B2 * | 6/2005 | Leung et al. | ............... | 370/278 |
| 6,957,329 B1 * | 10/2005 | Aleksic et al. | ............... | 713/150 |
| 6,968,383 B1 * | 11/2005 | Heutschi et al. | ............... | 709/228 |
| 2004/0055016 A1 * | 3/2004 | Anipindi et al. | ............... | 725/110 |

OTHER PUBLICATIONS

MoneyTree Software Company, "Understanding the Windows Clipboard," 2002, 3 pages.
Microsoft Corporation, "Microsoft Knowledge Base Article—221190, OFF2000: Using the Office 2000 Clipboard," 2002, 2 pages.
Microsoft Corporation, "Microsoft Knowledge Base Article—318760, How To: Use the ClipPool Utility (Clippool.exe) to Share a Clipboard Among Computers in Windows 2000," 2002, 3 pages.
Microsoft Corporation, "Microsoft Knowledge Base Article—86926, Using the Dynamic Data Exchange Management Library," 2002, 5 pages.

(Continued)

*Primary Examiner*—Abdullahi Salad
*Assistant Examiner*—El Hadji Sall
(74) *Attorney, Agent, or Firm*—Hickman Palermo Truong & Becker LLP; Edward A. Becker

(57) ABSTRACT

A mechanism is described in which data from a first application running on a first computer is stored for access over a network by a second application running on a second computer. In one aspect, messages are periodically broadcast over the network to indicate that data has been stored for transfer. A list is displayed identifying computers that have broadcast messages regarding the transfer of data. In one aspect, the data is part of a file rather than an entire file.

30 Claims, 4 Drawing Sheets

OTHER PUBLICATIONS

Microsoft Corporation, "Microsoft Knowledge Base Article—154459, Description of Microsoft NetMeeting," 2002, 1 page.
The Santa Cruz Operation, Inc., "SAP broadcasts," 2 pages.
The Santa Cruz Operation, Inc., "Periodic broadcasts," 1 page.
J. Veizades, et al., "Service Location Protocol," Network Working Group, Request for Comments: 2165, Jun. 1997, 89 pages.

* cited by examiner

MECHANISM FOR TRANSFERRING DATA BETWEEN APPLICATIONS RUNNING ON MULTIPLE NETWORKED COMPUTERS

FIELD OF THE INVENTION

The present invention relates generally to the use of computers and, more specifically, to a mechanism for transferring data between applications running on multiple networked computers.

BACKGROUND OF THE INVENTION

Data transfer between applications is a common practice. For example, the "copy and paste" procedure used among applications in a personal computing environment is well known, such as copying information from an Excel spreadsheet into a Word document. This procedure relies on the "clipboard" functionality of the operating system, which utilizes RAM to temporarily store information.

When using a "Cut" and "Copy" function from a source application, information is transferred to the clipboard, in a particular format, such as text, a bitmap, or a metafile. When a "Paste" function is subsequently selected from a destination application, a program determines whether the clipboard contains information in a format the particular program can use. If so, the information is transferred to the destination application from the clipboard.

There are fundamental limitations with respect to current data transfer capabilities between computer applications. One such limitation is the absence of a feature to copy information from an application running on computer A using one operating system to an application running on computer B using a different operating system. For example, cutting from a Windows application and pasting to a Unix application.

One typical approach to this limitation is for users to copy the content from a source machine onto a removable storage medium, such as a floppy disk, and to manually transfer the content to a destination machine by reading from the floppy disk at the destination machine. Another approach, which is applicable in a network environment, is to copy content from a source machine to a temporary directory accessible from machines on a network, for example, on a shared file server, and to transfer the content to a destination machine by reading the content from the temporary directory via the destination machine. In both of the foregoing approaches, to transfer content from one application to another or one machine to another, a user is required to create a temporary intermediate file containing the content and to perform numerous related operations with respect to copying, storing, reading, and pasting the content.

Based on the foregoing, it is clearly desirable to provide a mechanism for transferring data between applications running on different networked computers.

SUMMARY

According to one aspect, a method comprises storing data from a first application executing on a first, or source, computer for transfer to a second, or destination, computer on a network. A source message is periodically broadcast over the network indicating that data from the first computer is stored for transfer. A destination message is received indicating a request to transfer the data to the destination computer, and the data is transferred to the destination computer. In an embodiment, an indication is displayed, in response to a query message, identifying computers connected to the network that have broadcast a source message. In an embodiment, the data is transferred to a second application executing on the second computer.

According to various embodiments, the data is stored on the source computer or on a third computer; the data is a part of a file that is less than the entire file; the network is a private network; and the first application running on the source computer is different than the second application running on the destination computer. In an embodiment, the data is stored in response to an operation performed using the first application, such as a "Copy To" operation; and in another embodiment, the data is transferred to the second application in response to an operation performed using the second application, such as a "Paste From" operation.

Various implementations of the techniques described herein are embodied in computer-readable medium and apparatuses.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A mechanism for transferring data between applications running on multiple networked computers is described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment Example

Figure 1:
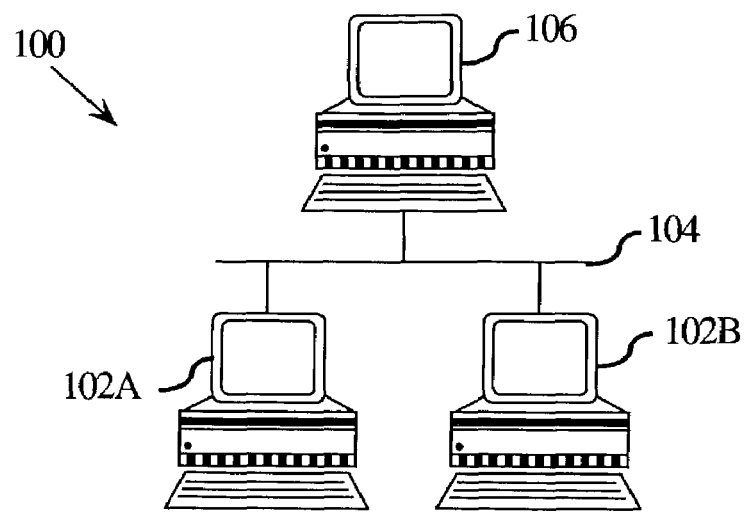
FIG. 1 is a block diagram illustrating a simple operating environment 100 in which embodiments can be implemented.

FIG. 1 is a block diagram illustrating a simple operating environment 100 in which embodiments can be implemented. The environment 100 includes at least two computers 102A, 102B connected to a network 104. Computers 102A, 102B represent any conventional computing platform, such as a desktop computer, workstation, hand-held computer, etc. There may be any number of computers similar to computers 102A, 102B communicatively connected through the network 104. In various embodiments, network 104 is a private network such as a LAN, or alternatively, the public Internet. The protocol utilized by computer 102A, 102B to communicate is any conventional network communication protocol, such as TCP/IP.

In an embodiment, the environment 100 includes an optional data transfer server 106 connected to network 104. Thus, data transfer server 106 communicates with computers 102A, 102B via network 104. Data transfer server 106 can be implemented as computer hardware, software, or a combination of computer hardware and software. Data transfer server 106 can be implemented as an entity separate from computers 102A, 102B, or alternatively, as a software application executing on any computer connected to the network 104, including computers 102A, 102B. According to this embodiment, data transfer server 106 is configured to perform some functions relating to transferring data between two computers, instead of performing those functions at computers 102A, 102B. The functionality of data transfer server 106 is described in more detail below.

Functional Components

Figure 2:
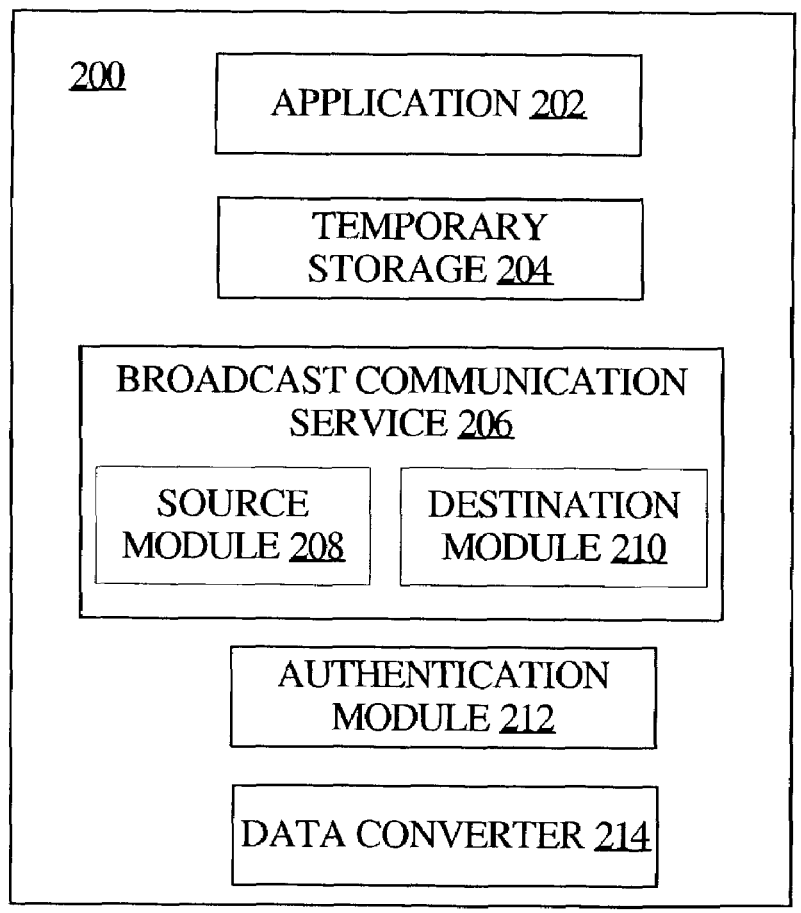
FIG. 2 is a block diagram illustrating functional components of a computer, according to an embodiment.

FIG. 2 is a block diagram illustrating functional components 200 of a computer, such as computers 102A, 102B, according to an embodiment. Functional components 200 can be implemented as hardware, software, or a combination of both.

Functional components 200 include an application 202 that represents any computer software application from which information can be transferred from or transferred to. For example, a first application 202 on computer 102A might be Microsoft Excel, whereas a second application 202 on computer 102B might be Microsoft Word.

In an embodiment, functional components 200 include temporary storage 204, for temporarily storing information for subsequent transfer to another computer over the network 104. For example, temporary storage 204 might be a clipboard buffer or similar functionality that stores data as part of a "Cut" or "Copy" operation associated with common software applications. In other words, temporary storage 204 is a place in the local memory of computer 102A or 102B, typically RAM, where information is temporarily stored as part of a process, feature or function of computer 102A, 102B.

Embodiments are directed to a mechanism for transferring data between multiple computers, thus, in the example environment 100 (FIG. 1), each of computers 102A, 102B can serve both as a source and a destination of the data transfer. Hence, the configuration illustrated in FIG. 2 is applicable to any computer implementing the data transfer mechanisms described herein.

Functional components 200 include a broadcast communication service 206 that includes a source module 208 and a destination module 210, to provide both source and destination functionality with respect to the transfer of data. The broadcast communication service 206 is any conventional or proprietary broadcast protocol means. For example, implementations might utilize the Service Advertising Protocol (SAP) over IPX/SPX, or Service Location Protocol (SLP) over IP, as the broadcast protocol associated with the broadcast communication service 206.

In this context, the data source computer acts as a server and the data destination computer acts as a client. Before a client can communicate with a server it must know what servers are available on the network. This information is made available by the broadcast communication service 206, which uses a broadcast protocol to register and to provide information about all of the known servers throughout the network, such as file servers, print servers, and the like. Thus, the source module 208 of broadcast communication service 206 provides capability for a data source computer, such as computer 102A acting as a data or file server, to periodically broadcast a message ("source message") to the network advertising that it is acting as a server. That is, computer 102A broadcasts a source message, via the source module 208, indicating that it has stored data for transfer to another computer 102B over the network 104 (FIG. 1). The data is either stored locally in temporary storage 204 or, alternatively, on another machine, such as data transfer server 106 (FIG. 1).

Source module 208 broadcasts the source message to the network according to the associated broadcast protocol. In turn, destination module 210 provides the ability to query the network for server identification information, which includes information indicating that one or more computers are acting as a server and have stored data for transfer, using the associated protocol. For example, computer 102B can query the network by broadcasting a query message via destination module 210, to determine whether computer 102A or any other computer on the network has previously broadcast a source message. Querying the network essentially broadcasts a query message to each of the computers on the network. Alternatively, in a configuration that includes a data transfer server 106, a query message could be directed to the data transfer server 106 as a centralized service broadcast manager, to determine whether a source message has been broadcast.

Optionally, computers 102A, 102B can be configured with an authentication module 212 to provide the capability to authenticate another computer. Authentication module operates to transmit authentication information from one computer to another. The various functions of authentication module 212 are described in more detail in reference to a process illustrated in FIG. 3.

Optionally, functional components 200 can be configured with data converter 214 to convert data from a format associated with a first application to a common format. Furthermore, data converter 214 converts data from the common format to a format associated with a second application. For example, if data is transferred between two applications with incompatible data formats, the data converter 214 at the source computer is used to convert data from a first proprietary format to a common format, such as the XML (Extensible Markup Language) format. Further, the data converter 214 at the destination computer is used to convert the data from the common format to a second proprietary format.

Processes for Transferring Information Between Computers Over a Network

Figure 3:
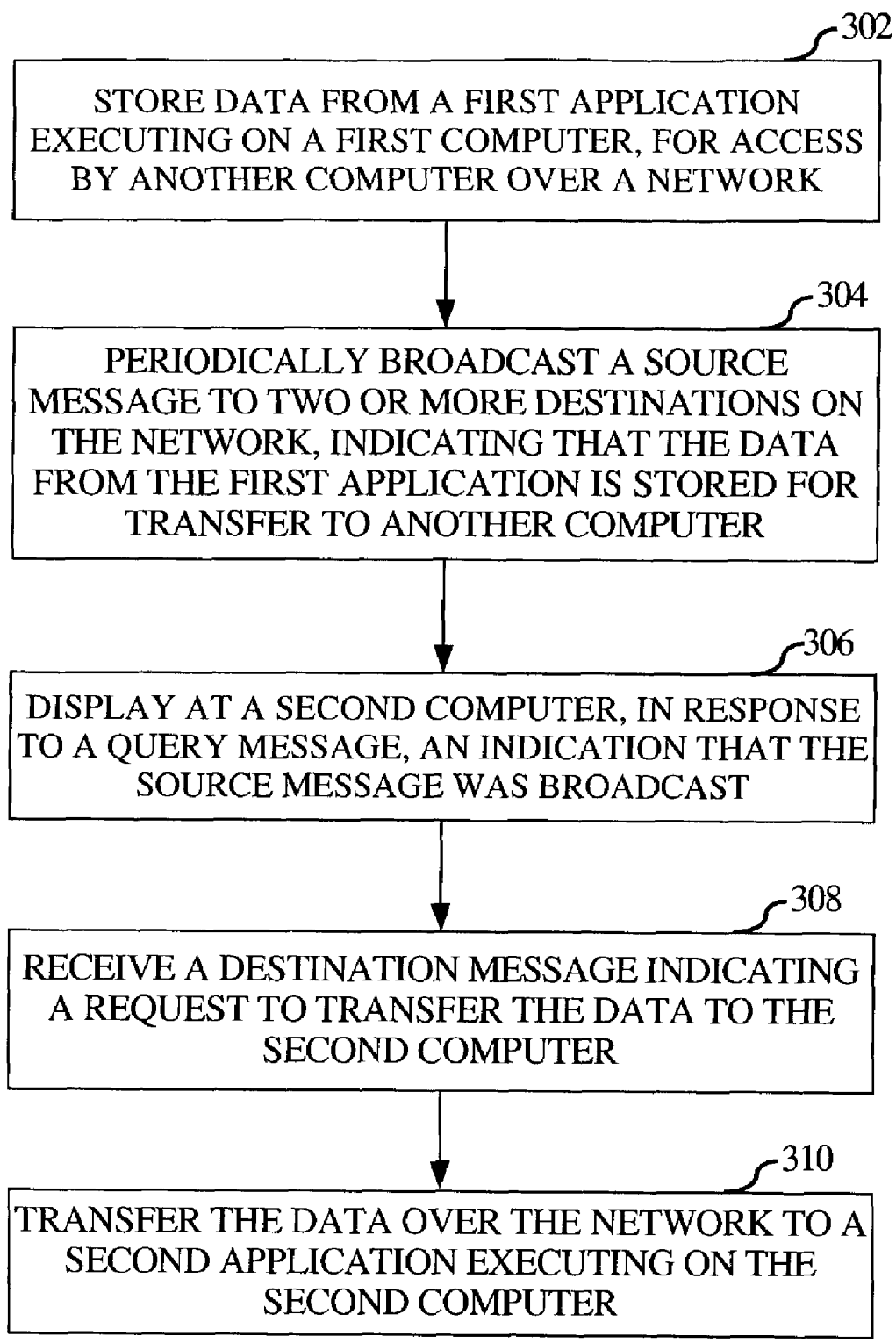
FIG. 3 is a flowchart illustrating a process for transferring information over a network between a first application running on a first computer and a second application running on a second computer.

FIG. 3 is a flowchart illustrating a process for transferring information over a network between a first application running on a first computer and a second application running on a second computer.

At block 302, data from a first application is stored for access by another computer over a network. In an embodiment, the data is stored on the first computer, which is running the first application. For example, the data is stored in a temporary memory storage, such as temporary storage 204 (FIG. 2) or a clipboard buffer. In another embodiment, the data is stored on a third computer that is different than the first and second computers. For example, the data is stored on data transfer server 106 (FIG. 1).

In an embodiment, the data from the first application that is stored at block 302 is a portion of a file, that is, it is less than the entire file. This is in contrast to typical data storage on a file server, on which entire files are stored. As an implementation detail, the data may be stored solely on the first computer, solely on the third computer, or on both computers.

In an embodiment, the first application is different than the second application, thus, at block 302 the data is stored for access by the second application. In a related embodiment in which the data formats of the first and second application are incompatible, the data is converted from a format associated with the first application to a common format (e.g., XML) prior to storing the data for access by the second application. Furthermore, the data is converted to a format associated with the second application from the common format at the second computer.

In an embodiment, the step of storing the data is in response to performance of a conventional and well-known "Cut" or "Copy" or similarly functioning operation using the first or source application. These operations are common in many computer software applications. As an implementation detail, performance of these operations within the first application can invoke a routine to execute at least block 302. In addition, a new operation, "Copy To", can be implemented to operate with existing software applications to trigger storage of the data, block 302, and broadcast of a source message, block 304. A "Copy To" operation might also request a network address of a computer to which the data is to be transferred.

In an embodiment, substantially concurrent with the step of storing the data, a port at the source computer is set to a predetermined setting which indicates to other devices on the network that the source computer has stored data for transfer. Therefore, other devices on the network can probe the network for computers with data to transfer. Additionally, the port setting can be set to expire after a predetermined period of time and returns to a default setting, at which point the data transfer process expires.

At block 304, a source message is broadcast over the network to indicate that data from the first computer is stored for transfer to another computer over the network. In this context, the message is broadcast from a single source to multiple destinations connected to the network or to a subnetwork. In an embodiment, the source message is periodically broadcast over the network at step 304.

The message is broadcast with information, such as header information, such that each computer or device connected to the network is able to receive the message. This step is in contrast to, for example, sending an e-mail to multiple recipients because (1) e-mails are not broadcast in this manner such that all devices on the network can receive it; (2) e-mails are not periodically broadcast to the entire network; (3) nor does sending an e-mail trigger a message indicating that data has been stored for transfer to another computer. Furthermore, this step is in contrast to conventional peer-to-peer network communication architectures due to its active broadcasting of messages over a network.

In the embodiment described above, in which a port on the source computer is set to indicate that data is available for transfer to an application on another computer, the source computer need not broadcast a source message. Thus, a destination computer or any other computer connected to the network, can determine that the source or other computer has stored data for transfer to another computer, by querying port settings of devices on the network or subnetwork. As a result of such a query, the querying computer can recognize that a particular computer has data available for transfer by recognizing the predetermined port setting of a port on the particular computer.

In an embodiment, the network is a private network, and the step of broadcasting the source message, block 304, is limited to the private network.

In an embodiment in which a third computer is used, such as data transfer server 106 (FIG. 1), broadcasting the source message at block 304 can be initiated by the third computer rather than the first or source computer.

In an embodiment, optionally, at block 306, an indication that the source message was broadcast is displayed at the second computer. In a related embodiment, the indication that is displayed is a list identifying computers connected to the network that have broadcast a source message. In one embodiment, the list is displayed in response to a query message. For example, the second or destination computer broadcasts a query to the network to determine if any computers are acting as servers on the network by storing data for transfer to the second computer. That is, the second computer queries the network for previous broadcasts of source messages. In a related embodiment, the query message is broadcast or transmitted by a third computer, such as data transfer server 106 (FIG. 1).

The ability to broadcast query messages to a network is a feature of certain service advertising or locating protocols (e.g., SAP and SLP). Hence, a client on a network is able to determine what services are available on the network, and to obtain the network addresses of the nodes or servers from which a respective service can be accessed. Consequently, this feature facilitates initiation of a session between two computers because network addresses are needed to establish a session.

In an embodiment, a third computer, such as data transfer server 106 (FIG. 1), serves as a broadcast manager. As such, the third computer facilitates, manages, processes, controls and/or stores information relative to the broadcast of source messages for source computers. Consequently, the third computer facilitates the display of the indication or the list on the second or destination computer. Furthermore, the third computer can be used as a proxy to the second or destination computer to transmit the query message to the network.

Furthermore, in an embodiment, a query message is triggered in response to performance of a conventional and well-known "Paste" or similar operation using the second or destination application. This operation is common in many computer software applications. As an implementation detail, performance of this operation within the second application can invoke a routine to execute block 306. In addition, a new operation, "Paste From", can be implemented to operate with existing software applications to trigger querying the network for previous broadcasts of source messages and displaying the list of broadcasting source computers, block 306. A "Paste From" operation might also request a network address of a computer from which the data is to be transferred, instead of triggering the network query.

At block 308, a message from a destination computer ("destination message") is sent to the first computer indicating a request to transfer the data to the second computer. In an embodiment, the destination message is sent in response to a selection from the list that is displayed at block 306. For example, if a user at the second computer wants to determine whether another computer has stored some data for transfer to the second computer, the second computer can query the network, which responds with a pop-up menu displaying a list of computers, block 306, that have broadcast messages, block 304. The user at the second computer selects, with a mouse or other pointing device, the network address or some other identifying information from the list. This selection from the list then triggers a message from the second computer to the first computer, indicating that the second computer is willing to accept or receive the data from the first computer.

In an embodiment, the process depicted in FIG. 3 includes optional steps of sending to the first computer an authentication request; sending to the second computer from the first computer, in response to the authentication request, information to authenticate the first computer; and sending to the second computer from the first computer, a message that identifies the location in memory at which the data is stored.

For example, upon the second computer selecting the first computer from the list and triggering a destination message to the first computer, the destination message comprises a trigger to display a text entry frame or other input or response mechanism at the first computer, thereby requesting a password or other conventional identification, authentication, or verification information. The first computer responds to the request by entering the appropriate information, which is sent to the second computer. The second computer, or a user at the second computer, then verifies the information received from the first computer through conventional means, thus authenticating the identification and authority of the first computer to transfer data to the second computer. This process provides a level of security with respect to the data transfer, ensuring the second computer that the first computer is legitimately trying to transfer data to the second computer.

Furthermore, the authentication process described above can be implemented for the first or source computer to authenticate the second or destination computer. Thus, the authentication request would be sent to the second or destination computer, which would in turn reply with identifying information for verification by the first or source computer. Implementation of the process in this direction can ensure the first computer that the second computer is a legitimate recipient of the transferred data.

At some point, either concurrent with the transmission of the appropriate identification information from the first computer or subsequent thereto, the first computer also informs the second computer as to the location in memory of the data for transfer. Hence, in an embodiment, the second computer actively initiates the data transfer from the first computer, by pulling it from the memory, such as temporary storage 204 (FIG. 2), of the first computer.

In an embodiment in which a data transfer server 106 (FIG. 1) is configured to serve as an intermediary or middleware among computers on a network 104 (FIG. 1), the preceding steps regarding the authentication of a computer can be performed or triggered by the data transfer server 106. For example, the data transfer server 106 sends the authentication request to either the source or destination computer, depending on the implementation, and performs the authentication of the respective computer based on the identifying information provided in a reply. Further, the data transfer server 106 can send the memory location to the destination computer, whether the data is stored in temporary storage 204 (FIG. 2) of the source computer or in memory associated with the data transfer server 106.

At block 310, the data is transferred over the network to a second application running on the second computer. In an embodiment, the step of transferring data comprises automatically transferring the data from the first or source computer to the second or destination computer in response to the destination message sent from the destination computer at block 308. For example, once the source computer is selected from the list displayed at block 306, and any authentication procedure is completed, if applicable, the data is automatically transferred to the second application running on the second or destination computer. That is, the data is read from temporary storage 204 (FIG. 2) of the source computer or from the data transfer server 106 (FIG. 1), depending on the implementation, and conventionally transmitted over the network 104 (FIG. 1) to the application 202 (FIG. 2) running on the destination computer. Any transmission protocol applicable on the network 104, such as TCP/IP, is suitable for use in transferring data at block 310. The transferred data may be pasted directly into the second application at the destination computer, or may be stored in temporary storage 204 at the destination computer prior to final transfer to the second application.

In an embodiment that includes a data transfer server 106 (FIG. 1), the step of transferring the data to the second application, block 310, is initiated by a third computer, such as data transfer server 106, regardless of whether the data is stored on the source computer or on the data transfer server 106.

Figure 4:
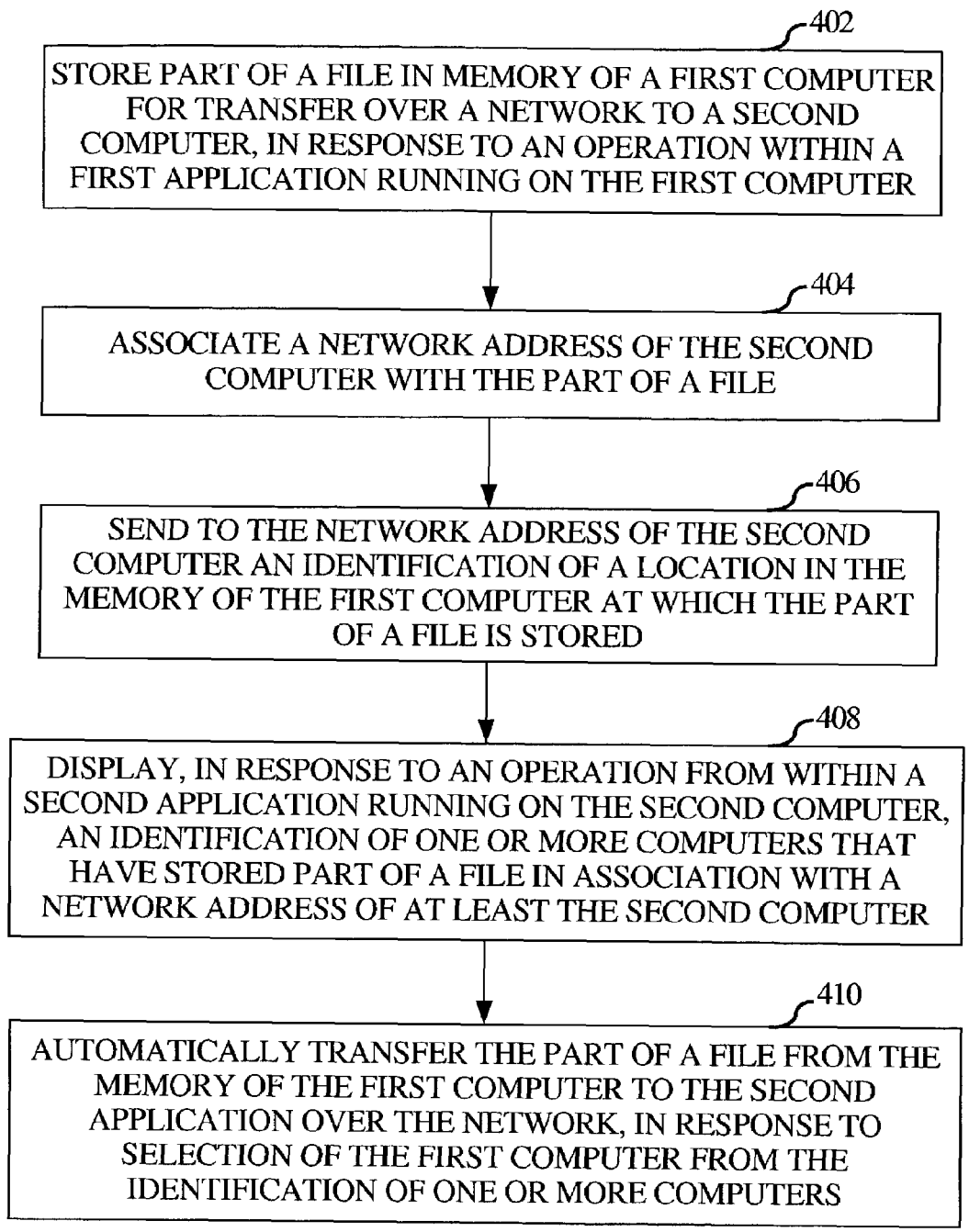
FIG. 4 is flowchart illustrating a process for transferring part of a file over a network from a first application running on a first computer to a second application running on a second computer.

FIG. 4 is flowchart illustrating a process for transferring part of a file over a network from a first application running on a first computer to a second application running on a second computer.

At block 402, a part of a file is stored in memory of a first computer ("source computer") for transfer over a network to a second computer ("destination computer"). In an embodiment, step 402 is in response to an operation within a first application running on the first computer. For example, a user at the first computer performs a "Copy", "Cut", or "Copy To" operation on the data of interest from within a given application, which triggers storage of the data in a temporary storage 204 (FIG. 2) on the source computer, such as a clipboard buffer within RAM. In an embodiment, if no response is received from the destination computer within an allocated time, the data transfer process "times out" or expires, and the data is cleared from memory. Thus, computing resources are freed for other uses.

At block 404, a network address of the destination computer is associated with the part of the file. This step can be implemented in a number of manners. For example, in response to a "Copy To" operation, a text entry mechanism such as a window, frame or text-entry box is displayed on the source computer. A user can enter identifying information regarding the destination computer into the text entry mechanism. Examples of identifying information include, but are not limited to, the network address of or a name associated with the destination computer. In an embodiment, instead of a text entry mechanism, a pop-up menu is displayed, which lists identifying information for all of the computers on the network, from which the destination computer can be selected.

At block 406, an identification of a location in the memory of the source computer, at which the part of a file is stored, is sent to the network address of the destination computer. In an embodiment, block 406 is performed in response to an authentication procedure between the source and destination computers, through which respective identities are verified.

At block 408, a list is displayed that identifies zero or more computers that have stored part of a file in association with a network address of the destination computer. In an embodiment, block 408 is performed in response to an operation from within a second application running on the second or destination computer. For example, a user at the destination computer performs a "Paste", or "Paste From" operation from within a given application, which triggers displaying the list of source computers. The list can be implemented to display information about all source computers that have stored parts of files for transfer to another computer over the network, or to only display information, at a given destination computer, about source computers that have stored part of files in association with the network address of the given destination computer.

Note that an implementation of the process described in FIG. 4 can operate with blocks 406 and 408 in either order. That is, block 408 may be performed after or before block 406. For example, sending the memory location of the part of a file to the destination computer, block 406, can occur after display of the list, block 408, or after selection of the given source computer from the list.

Regardless of the order of performance of block 406 and 408, at block 410 the part of a file is automatically transferred over the network from the location in memory of the source computer to the second application running on the destination computer. The part of the file may be stored in temporary storage at the destination computer, as part of the transfer at block 410. In an embodiment, the transfer is made in response to selection of the source computer from the list displayed at block 408. Because the memory location of the data is sent to the destination computer at block 406 prior to block 410, the transfer of the data at block 410 is automatic in that users at the source and destination computers need not perform any steps after selection of the source computer from the list. Thus, the destination computer can pull the part of the file from the temporary storage memory of the source computer.

As an implementation detail, either a source-side or destination-side routine running on the source or destination computers, respectively, initiates the transfer of the part of the file from the temporary storage of the source computer to the second application of the destination computer. Thus, in an embodiment, the step of block 406 is not performed, and the source computer pushes the part of the file to the destination computer in response to selection from the list, and any authentication procedure, if any.

The foregoing processes represent, generally, methods for transferring data between applications running on multiple networked computers. Although process steps are described in a particular order in FIGS. 3 and 4, unless otherwise indicated, embodiments of the invention are not necessarily limited to any particular order of carrying out such steps, nor are embodiments necessarily limited to carrying out every step described. Thus, implementation of the principles, techniques, and mechanisms described herein may vary considerably and still fall within the scope of the invention.

Implementation Mechanism

Figure 5:
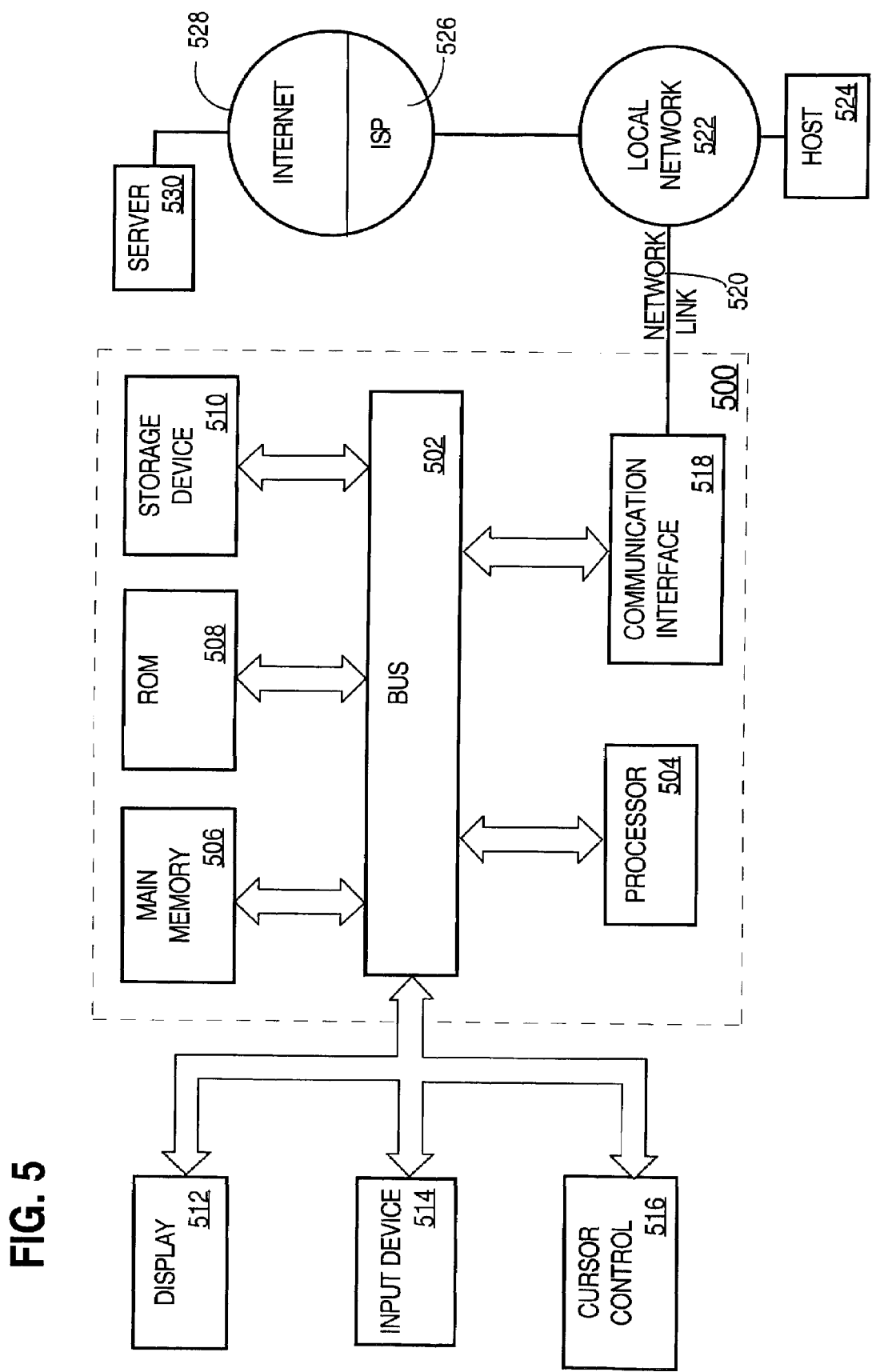
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, or magneto-optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to an embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media or volatile media. Non-volatile media includes, for example, optical, magnetic, or magneto-optical disks, such as storage device 510. Volatile media includes dynamic memory, such as main memory 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

For purposes of examination, the deletion of such embodiments is being treated as an explicit act to remove such embodiments from the scope of the claims.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for transferring data between computers on a network, the method comprising the computer-implemented steps of:

storing data from a file associated with a first application executing on a first computer on the network for transfer to a second computer on the network;

periodically broadcasting, using a broadcast protocol, a source message to two or more destinations on the network, the source message indicating that the data from the file associated with the first application is stored for transfer to the second computer;

wherein broadcasting comprises automatically determining, by a broadcasting service executing on the first computer and not based on specific selection of the two or more destinations on the network, to which two or more destinations on the network to simultaneously send the source message;

receiving a destination message indicating a request to transfer the data from the file associated with the first application to the second computer; and in response to the destination message, transferring the data from the file associated with the first application over the network to the second computer, including pasting the data from the file associated with the first application directly into a specified location of a specified file associated with a second application executing on the second computer.

2. The method of claim 1, further comprising the computer-implemented step of:

in response to a broadcast protocol query message that queries the network for one or more computers acting as servers and having data stored for transfer, displaying at the second computer an indication that the source message was broadcast.

3. The method of claim 2, wherein the step of displaying an indication includes displaying an identification of one or more computers connected to the network that have broadcast a source message; and wherein the step of sending a destination message is in response to a selection from the display at the second computer.

4. The method of claim 1, wherein the first application is different than the second application; and wherein the step of storing the data from the first application includes storing the data in a form compatible with the second application.

5. The method of claim 4, further comprising the steps of:

converting the data from a first application format to a common format prior to storing the data for access by the second application; and converting the data from the common format to a second application format at the second computer.

6. The method of claim 1, wherein the step of storing data includes storing the data on the first computer.

7. The method of claim 1, wherein the data is a portion of a file that is less than the entire file;

wherein the step of storing the data includes storing the portion of a file that is less than the entire file; and wherein the step of transferring the data includes transferring the portion of the file that is less than the entire file.

8. The method of claim 1,
wherein the network is a private network; and
wherein the step of broadcasting a source message is limited to broadcasting the source message to destinations on the private network.

9. The method of claim 1, wherein the step of transferring the data includes automatically transferring the data from the first computer to the second computer in response to the destination message from the second computer.

10. The method of claim 1, further comprising the steps of:
sending to the first computer an authentication request;
sending to the second computer from the first computer information to authenticate the first computer, in response to the authentication request; and
sending to the second computer from the first computer an identifying message identifying a location in memory at which the data is stored.

11. The method of claim 10, wherein the step of transferring the data is initiated by the second computer by pulling the data from where it is stored.

12. The method of claim 1, wherein the steps of broadcasting the source message and transferring the data are initiated by a third computer different than the first computer and the second computer.

13. The method of claim 12, wherein the step of storing the data stores the data on the third computer.

14. The method of claim 1, wherein the step of storing the data is in response to performance of a "Cut", "Copy", or "Copy To" operation using the first application, whereby the data is stored in a temporary storage of the first computer.

15. The method of claim 1, further comprising the step of performing a "Paste" or "Paste From" operation using the second application, whereby a query message is triggered to query whether a source message has been broadcast over the network.

16. The method of claim 1, wherein the step of broadcasting a source message includes sending an e-mail message.

17. A method for transferring part of a file over a private network from a source application executing on a source computer to a destination application executing on a destination computer, the method comprising the steps of:
storing the part of a file in memory for transfer to the destination computer, in response to performance of an operation from within the source application;
periodically broadcasting, using a broadcast protocol, a source message to two or more destinations on the network, the source message indicating that the part of a file from the source application is stored for transfer to at least the destination computer;
wherein broadcasting comprises automatically determining, by a broadcasting service executing on the source computer and not based on specific selection of the two or more destinations on the network, to which two or more destinations on the network to simultaneously send the source message;
identifying, by a broadcasting service executing on the destination computer, one or more computers that have stored part of a file in association with the network address of at least the destination computer, in response to an operation from within the destination application;
receiving a destination message indicating a request to transfer the part of a file to the destination computer;
sending an authentication request to the source or destination computer;
sending to the source or destination computer that sent the authentication request, in response to the authentication request, information to authenticate the source or destination computer that did not send the authentication request; and
transferring the part of a file to a specified location within a specified file at the destination application over the private network, in response to selection of the source computer by the destination computer.

18. A computer-readable medium carrying one or more sequences of instructions for transferring data over a network between a first application executing on a first computer and a second application executing on a second computer, wherein execution of the one or more sequences of instructions by one or more processors causes the one or more processors to perform the steps of:
storing data from a file associated with a first application executing on a first computer on the network for transfer to a second computer on the network;
periodically broadcasting, using a broadcast protocol, a source message to two or more destinations on the network, the source message indicating that the data from the file associated with the first application is stored for transfer to the second computer;
wherein broadcasting comprises automatically determining, by a broadcasting service executing on the first computer and not based on specific selection of the two or more destinations on the network, to which two or more destinations on the network to simultaneously send the source message;
receiving a destination message indicating a request to transfer the data from the file associated with the first application to the second computer; and
in response to the destination message, transferring the data from the file associated with the first application over the network to the second computer, including pasting the data from the file associated with the first application directly into a specified location of a specified file associated with a second application executing on the second computer.

19. The computer-readable medium of claim 18, wherein execution of the one or more sequences of instructions by one or more processors causes the one or more processors to perform the steps of:
in response to a broadcast protocol query message that queries the network for one or more computers acting as servers and having data stored for transfer, displaying at the second computer an indication that the source message was broadcast.

20. The computer-readable medium of claim 18,
wherein the step of displaying an indication includes displaying an identification of one or more computers connected to the network that have broadcast a source message; and
wherein the step of sending a destination message is in response to a selection from the display at the second computer.

21. The computer-readable medium of claim 18,
wherein the first application is different than the second application; and
wherein the step of storing the data from the first application includes storing the data in a form compatible with the second application.

22. The computer-readable medium of claim 21, further comprising the steps of:
- converting the data from a first application format to a common format prior to storing the data for access by the second application; and
- converting the data from the common format to a second application format at the second computer.

23. The computer-readable medium of claim 18, wherein the step of storing data includes storing the data on the first computer.

24. The computer-readable medium of claim 18,
- wherein the data is a portion of a file that is less than the entire file;
- wherein the step of storing the data includes storing the portion of a file that is less than the entire file; and
- wherein the step of transferring the data includes transferring the portion of the file that is less than the entire file.

25. The computer-readable medium of claim 18,
- wherein the network is a private network; and
- wherein the step of broadcasting a source message over the network is limited to broadcasting the source message to the private network.

26. The computer-readable medium of claim 18, wherein execution of the one or more sequences of instructions by one or more processors causes the one or more processors to perform the steps of:
- sending to the first computer an authentication request;
- sending to the second computer from the first computer information to authenticate the first computer, in response to the authentication request; and
- sending to the second computer from the first computer an identifying message identifying a location in memory at which the data is stored.

27. A computer-readable medium carrying one or more sequences of instructions for transferring part of a file over a private network from a source application executing on a source computer to a destination application executing on a destination computer, wherein execution of the one or more sequences of instructions by one or more processors causes the one or more processors to perform the steps of:
- storing the part of a file in memory for transfer to the destination computer, in response to performance of an operation from within the source application;
- periodically broadcasting, using a broadcast protocol, a source message to two or more destinations on the private network, the source message indicating that the part of a file from the source application is stored for transfer to at least the destination computer;
- wherein broadcasting comprises automatically determining, by a broadcasting service executing on the source computer and not based on specific selection of the two or more destinations on the network, to which two or more destinations on the network to simultaneously send the source message;
- identifying, by a broadcasting service executing on the destination computer, one or more computers that have stored part of a file in association with the network address of at least the destination computer, in response to an operation from within the destination application;
- receiving a destination message indicating a request to transfer the part of a file to the destination computer;
- sending an authentication request to the source or destination computer;
- sending, in response to the authentication request and to the source or destination computer that sent the authentication request, information to authenticate the source or destination computer that did not send the authentication request; and
- transferring the part of a file to a specified location within a specified file at the destination application over the private network, in response to selection of the source computer by the destination computer.

28. A system for transferring data between computers on a network, the system comprising:
- means for storing data from a file associated with a first application executing on a first computer on the network for transfer to a second computer on the network;
- means for periodically broadcasting, using a broadcast protocol, a source message to two or more destinations on the network, the source message indicating that the data from the file associated with the first application is stored for transfer to the second computer;
- wherein the means for broadcasting comprise means for automatically determining, by a broadcasting service executing on the first computer and not based on specific selection of the two or more destinations on the network, to which two or more destinations on the network to simultaneously send the source message;
- means for receiving a destination message indicating a request to transfer the data to the second computer; and
- means for transferring, in response to the destination message, the data from the file associated with the first application over the network to the second computer, including pasting the data from the file associated with the first application directly into a specified location of a specified file associated with a second application executing on the second computer.

29. A computer system comprising:
- a memory;
- a network interface; and
- one or more processors coupled to the memory and configured to execute one or more sequence of instructions for transferring data between computers on a network, wherein execution of the one or more sequences of instructions by one or more processors causes the one or more processors to perform the steps of:
  - storing data from a file associated with a first application executing on a first computer on the network for transfer to a second computer on the network;
  - periodically broadcasting, using a broadcast protocol, a source message to two or more destinations on the network, the source message indicating that the data from the file associated with the first application is stored for transfer to the second computer;
  - wherein broadcasting comprises automatically determining, by a broadcasting service executing on the first computer and not based on specific selection of the two or more destinations on the network, to which two or more destinations on the network to simultaneously send the source message;
  - receiving a destination message indicating a request to transfer the data from the file associated with the first application to the second computer; and
  - in response to the destination message, transferring the data from the file associated with the first application over the network to the second computer, including pasting the data from the file associated with the first application directly into a specified location of a specified file associated with a second application executing on the second computer.

30. The method of claim 1, wherein the first computer is executing a first operating system and the second computer is executing a second operating system that is a different operating system from the first operating system.

* * * * *